United States Patent [19]

West-Harron

[11] 4,403,438
[45] Sep. 13, 1983

[54] DISPOSABLE RODENT TRAP

[76] Inventor: Aramynta West-Harron, Heyatawin Lodge, 189 Chelton Rd., Manitou Springs, Colo. 80828

[21] Appl. No.: 264,102

[22] Filed: May 15, 1981

[51] Int. Cl.³ .......................................... A01M 23/32
[52] U.S. Cl. ........................................ 43/81; 43/82
[58] Field of Search ............... 43/81, 81.5, 82, 77, 43/83, 83.5

[56] References Cited

U.S. PATENT DOCUMENTS

| | | | |
|---|---|---|---|
| 891,880 | 6/1908 | Timby | 43/82 |
| 1,389,626 | 9/1921 | Chute | 43/81 |
| 1,405,229 | 1/1922 | Kopke | 43/81 |
| 1,541,856 | 6/1925 | Sands | 43/83.5 |
| 1,714,068 | 5/1929 | Askin | 43/81 |
| 2,193,358 | 3/1940 | Guarino | 43/81 |
| 2,637,931 | 5/1953 | Sklar | 43/83 |
| 2,736,985 | 3/1956 | Nickey | 43/81 |
| 2,867,939 | 1/1959 | Evans | 43/83.5 |
| 2,869,280 | 1/1959 | Dobratz | 43/77 |
| 3,757,456 | 9/1973 | Lucci | 43/81 |
| 3,992,803 | 11/1976 | Kaiser | 43/83 |

*Primary Examiner*—Nicholas P. Godici
*Assistant Examiner*—Charles L. Willis
*Attorney, Agent, or Firm*—Richard W. Hanes

[57] ABSTRACT

The present invention relates to an improvement in rodent traps which allows traps to be pre-set and pre-baited during manufacture, placed in an appropriate housing and discarded after use. The trap consists of an essentially traditional spring biased killing jaw with a novel retaining device and release trigger. A retaining cord holds the jaw in a loaded position and is disposed to release the jaw when the cord is severed by being chewed by a rodent eating the bait which is impregnated into the cord at a point along its length between tie-down points.

3 Claims, 4 Drawing Figures

DISPOSABLE RODENT TRAP

BACKGROUND OF THE INVENTION

An almost infinite variety of animal traps have been devised, however the requirement still exists for an inexpensive pre-set killing trap which can be discarded after use. Traps which have enclosures or housing into which the animal crawls are usually of two types: the capturing and the capture-kill. U.S. Pat. No. 4,175,350 discloses a typical capture type device. If the trap is discarded, as suggested in the specification, the animal will die slowly—an undesireable effect. Traps of the second type are typically shown in U.S. Pat. Nos. 1,992,353, 2,684,553 and 1,218,406; however, none of these disclosures teach the concept of providing a pre-set device without the attendant risks of loading the spring or of having it released by accidental means.

It is therefore the primary object of the present invention to provide a rodent trap which is pre-set and pre-baited at the time of its purchase, requiring nothing more of the user than to place it in a strategic position.

Another object is to provide a pre-baited rodent trap which avoids the hazards of spring loading and baiting a trap.

Another object of the invention is to provide a trap which is safe and will avoid the accidents induced by children and pets.

Yes another object of the invention is to provide an animal trap which is disposable after one use and which is humane in its means for killing the animal.

Other and further objects will be revealed upon a reading of the following detailed description of a preferred form of the present invention taken in conjunction with the accompanying drawings in which.

DETAILED DESCRIPTION

Figure 1:
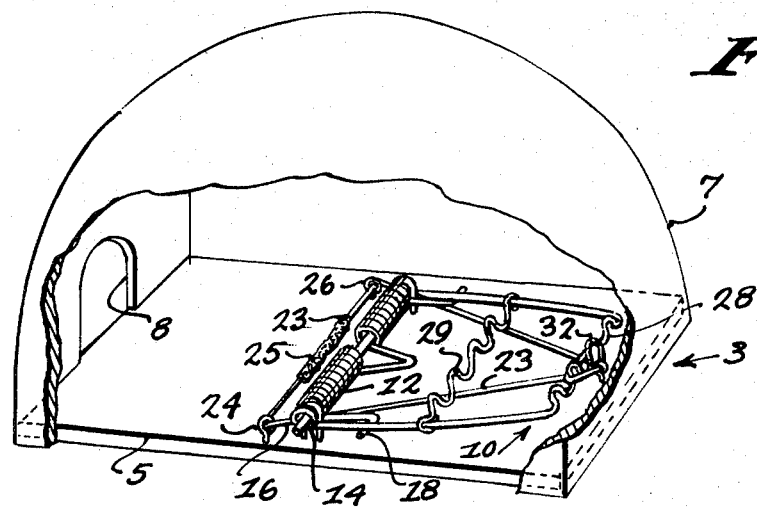
FIG. 1 is a perspective view of the trap showing a portion of the housing cut away to reveal the interior.

Referring now to the drawings of a preferred form of the invention, it is seen that the trap 3 includes a rigid base 5 upon which the trap mechanism is mounted with a semicircularly shaped housing 7 thereover. The housing 7 can be economically constructed from paper board, plastic or similar material and contains an opening 8 in one end thereof through which a mouse may enter in quest of the bait.

Figure 2:
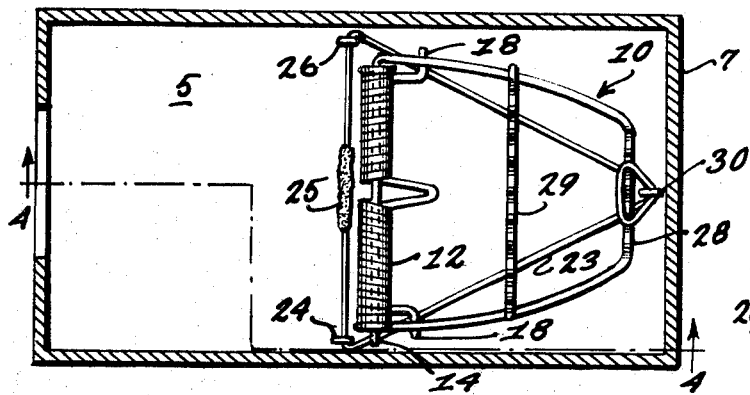
FIG. 2 is a top plan view of the interior of the trap with the housing cut away and shown in cross-section.
Figure 3:
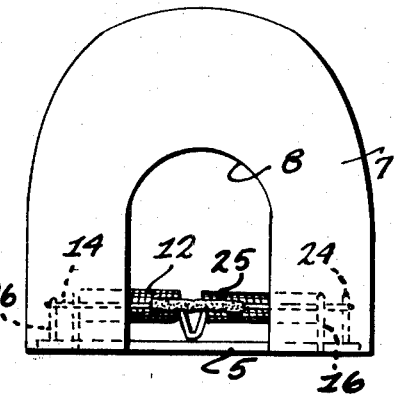
FIG. 3 is an end view of the trap.
Figure 4:
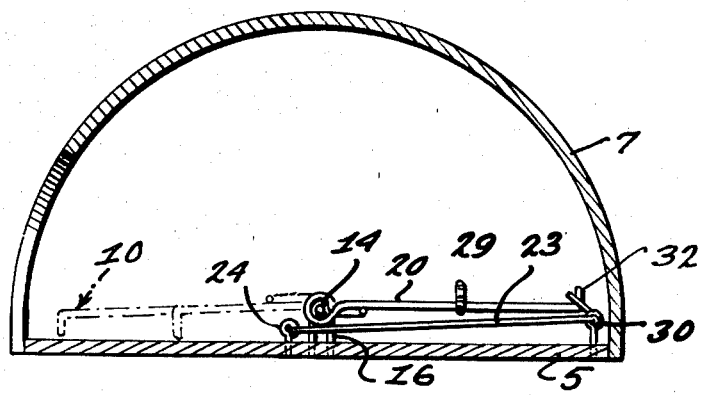
FIG. 4 is a cross-sectional view taken along lines 4—4 of FIG. 2 showing the jaw in full lines in its loaded position and in phantom lines in its released position.

The pivotal jaw 10 of the trap and its associated spring member 12 are substantially conventional in their basic construction, however the jaw construction itself has novel features. Instead of the customary single cross bar of similar traps in the prior art, the jaw 10 is equipped with both an outer bar 28 and an intermediate bar 29, both having a scalloped design. The duality of bars assures a more efficient result, especially when the rodent is advantageously positioned under the jaw by the restrictive entrance 8 in the housing 7. The spiral spring 12 is wound around a jaw spindle 14 which is attached to the base 5 by staples or similar fasteners 16. The ends 18 of the spring bear against the sides 20 of the pivotal jaw 10 so that when the jaw is held in the position shown in FIGS. 1 and 2 the spring 12 is biased to produce striking force on the jaw when it is released.

One of the novel concepts of the present invention is the construction of the trigger mechanism. An endless loop of cord or twine 23 is trained through two eyes 24 and 26 attached to the base near the ends of the spring 12. A third eye 30 is attached to the base 5 and positioned on the centerline of the base near the extreme outer end 28 of the jaw 10. Both sides of the trigger cord are made to run through the third eye 30 and loop back over an ear 32 or similar protruberance on the end bar 28 of the jaw 10. The cord holds the jaw down against the striking force being exerted on the jaw by the biased spring 12.

The trigger cord 23 releases the jaw when a rodent chews the cord and bait 25 in front of the spring where the cord has been soaked or crystalized with one of many available solutions which contain food substances which attract the kind of rodent which it is desired to trap. It takes very little chewing to sever the cord and allow the jaw to rapidly close over the neck and body of the rodent.

It is apparent that in the manufacturing process the pre-baited trigger cord 23 can be installed prior to placing the housing 7 on the trap base, thus providing a pre-set and pre-baited trap which can withstand the jarring and movement of shipping without setting off the trap.

I claim:

1. In a rodent trap having:

a base member;

a pivotal jaw attached to the base member; and spring means operably connected with the jaw for biasing the jaw into a first position; the improvement comprising:

at least three anchor means attached to the top side of the base member;

an endless loop bait-carrying trigger cord slidingly engagably held by said anchor means where the bait being carried by the cord is disposed at a position forward of the spring means and where at least one of said anchor means is disposed rearwardly of the spring means and positioned so as to bring said cord into contact with the jaw to maintain the jaw in a second position against the force of the spring means.

2. The trap of claim 1 wherein the anchor means include a pair of eyes spanning a reach of said cord, which reach carries the bait.

3. The trap of claim 2 wherein the pivotal jaw includes at least two scalloped shaped cross members.

* * * * *